(12) United States Patent
Garrow et al.

(10) Patent No.: US 7,457,763 B1
(45) Date of Patent: Nov. 25, 2008

(54) PREDICTIVE MAINTENANCE SYSTEM

(75) Inventors: Gary R. Garrow, Burbank, CA (US); Charles P. Newton, III, Rock Hill, SC (US); Patrick E. Weir, San Francisco, CA (US); David P. West, II, Newnan, GA (US); Michael Wetzer, Redwood City, CA (US)

(73) Assignee: Accenture Global Services GmbH (CH)

( * ) Notice: Subject to any disclaimer, the term of this patent is extended or adjusted under 35 U.S.C. 154(b) by 1032 days.

(21) Appl. No.: 09/947,157

(22) Filed: Sep. 4, 2001

(51) Int. Cl.
*G06Q 10/00* (2006.01)

(52) U.S. Cl. ............................................ 705/8; 702/81

(58) Field of Classification Search .................. 705/8, 705/7; 702/81
See application file for complete search history.

(56) References Cited

U.S. PATENT DOCUMENTS

| | | | |
|---|---|---|---|
| 4,744,026 A | 5/1988 | Vanderbei | |
| 4,908,775 A | 3/1990 | Palusamy et al. | |
| 5,216,612 A | 6/1993 | Cornett et al. | |
| 5,295,065 A | 3/1994 | Chapman et al. | |
| 5,311,562 A | 5/1994 | Palusamy et al. | |
| 5,331,579 A | 7/1994 | Maguire, Jr. et al. | |
| 5,343,388 A | 8/1994 | Wedelin | |
| 5,434,775 A | 7/1995 | Sims et al. | |
| 5,596,507 A | 1/1997 | Jones et al. | |
| 5,630,070 A | 5/1997 | Dietrich et al. | |
| 5,710,723 A | 1/1998 | Hoth et al. | |
| 5,737,728 A | 4/1998 | Sisley et al. | |
| 5,754,451 A * | 5/1998 | Williams | 702/185 |
| 5,778,381 A | 7/1998 | Sandifer | |
| 5,826,236 A | 10/1998 | Narimatsu et al. | |
| 5,877,961 A | 3/1999 | Moore | |
| 5,890,133 A | 3/1999 | Ernst | |
| 5,897,629 A | 4/1999 | Shinagawa et al. | |
| 5,918,219 A * | 6/1999 | Isherwood | 705/37 |
| 5,920,846 A | 7/1999 | Storch et al. | |
| 5,931,878 A * | 8/1999 | Chapin, Jr. | 701/30 |
| 5,963,911 A | 10/1999 | Walker et al. | |

(Continued)

FOREIGN PATENT DOCUMENTS

EP 0 639 815 A2 8/1994

(Continued)

OTHER PUBLICATIONS

Manny Gdalevitch, "MSG-3, The Intelligent Maintenance", Nov. 2000, Aircraft Maintenance Technology, pp. 1-6, retrieved from the web at: http://amtonline.com/publication/article.jsp?publd=1&id=1039.*

(Continued)

*Primary Examiner*—Jonathan G Sterrett
(74) *Attorney, Agent, or Firm*—Brinks Hofer Gilson & Lione

(57) ABSTRACT

A method and system for maintaining an item of equipment supports the provision of predictive maintenance in a manner which eliminates or reduces downtime of the equipment. The method includes tracking performance data on the equipment or a particular component of the equipment. At least one required maintenance activity is predicted based upon the performance data with respect to a defined performance standard. Performance of the required maintenance activity is scheduled at a defined respective time based upon the prediction.

15 Claims, 5 Drawing Sheets

U.S. PATENT DOCUMENTS

| | | | |
|---|---|---|---|
| 5,970,437 A | 10/1999 | Gorman et al. | |
| 5,970,466 A | 10/1999 | Detjen et al. | |
| 5,987,474 A | 11/1999 | Sandifer | |
| 5,995,915 A | 11/1999 | Reed et al. | |
| 6,006,171 A | 12/1999 | Vines et al. | |
| 6,014,633 A | 1/2000 | DeBusk et al. | |
| 6,038,539 A | 3/2000 | Maruyama et al. | |
| 6,067,486 A * | 5/2000 | Aragones et al. | 701/29 |
| 6,078,912 A | 6/2000 | Buerger et al. | |
| 6,101,481 A | 8/2000 | Miller | |
| 6,110,214 A | 8/2000 | Klimasauskas | |
| 6,128,543 A | 10/2000 | Hitchner | |
| 6,154,735 A | 11/2000 | Crone | |
| 6,175,934 B1 | 1/2001 | Hershey et al. | |
| 6,192,325 B1 | 2/2001 | Piety et al. | |
| 6,208,955 B1 | 3/2001 | Provan et al. | |
| 6,219,654 B1 | 4/2001 | Ruffin | |
| 6,230,200 B1 | 5/2001 | Forecast et al. | |
| 6,230,480 B1 | 5/2001 | Rollins, III | |
| 6,292,806 B1 | 9/2001 | Sandifer | |
| 6,308,162 B1 | 10/2001 | Oulmet et al. | |
| 6,321,207 B1 | 11/2001 | Ye | |
| 6,349,274 B1 | 2/2002 | Kay et al. | |
| 6,418,361 B2 * | 7/2002 | Sinex | 701/29 |
| 6,496,814 B1 * | 12/2002 | Busche | 706/21 |
| 6,571,158 B2 * | 5/2003 | Sinex | 701/29 |
| 6,580,982 B2 * | 6/2003 | Sinex | 701/29 |
| 6,594,786 B1 | 7/2003 | Connelly et al. | |
| 6,598,940 B2 * | 7/2003 | Sinex | 301/29 |
| 6,606,546 B2 * | 8/2003 | Sinex | 701/29 |
| 6,671,593 B2 * | 12/2003 | Sinex | 701/29 |
| 6,678,716 B1 | 1/2004 | Pronsati, Jr. et al. | |
| 6,684,136 B2 * | 1/2004 | Sinex | 701/29 |
| 6,691,006 B2 * | 2/2004 | Sinex | 701/29 |
| 6,691,064 B2 | 2/2004 | Vroman | |
| 6,691,244 B1 | 2/2004 | Kampe et al. | |
| 6,701,298 B1 | 3/2004 | Jutsen | |
| 6,714,829 B1 | 3/2004 | Wong | |
| 6,732,028 B2 | 5/2004 | Vanstory | |
| 6,738,748 B2 * | 5/2004 | Wetzer | 705/9 |
| 6,801,820 B1 | 10/2004 | Lilly et al. | |
| 6,820,038 B1 | 11/2004 | Wetzer et al. | |
| 6,980,959 B1 | 12/2005 | Garrow et al. | |
| 7,031,941 B2 | 4/2006 | Garrow et al. | |
| 7,058,587 B1 | 6/2006 | Horne | |
| 7,085,766 B2 | 8/2006 | Keith | |
| 7,124,059 B2 | 10/2006 | Wetzer et al. | |
| 7,231,374 B1 | 6/2007 | Balasinski | |
| 2001/0053991 A1 | 12/2001 | Bonabeu | |
| 2002/0007225 A1 | 1/2002 | Costello et al. | |
| 2002/0010615 A1 | 1/2002 | Jacobs | |
| 2002/0022984 A1 | 2/2002 | Daniel et al. | |
| 2002/0072988 A1 | 6/2002 | Aram | |
| 2002/0143561 A1 * | 10/2002 | Webb et al. | 705/1 |
| 2002/0156692 A1 | 10/2002 | Squeglia et al. | |
| 2003/0009253 A1 | 1/2003 | McIntrye | |
| 2003/0036939 A1 | 2/2003 | Flores et al. | |
| 2003/0050824 A1 | 3/2003 | Suernondt et al. | |
| 2003/0216888 A1 | 11/2003 | Ridolfo | |
| 2004/0019577 A1 | 1/2004 | Abdel-Malek et al. | |
| 2005/0187838 A1 | 8/2005 | Squeglia et al. | |
| 2007/0203779 A1 | 8/2007 | Tveit et al. | |

FOREIGN PATENT DOCUMENTS

| | | |
|---|---|---|
| EP | 1162557 A | 12/2001 |
| JP | 62026510 A | 2/1987 |
| JP | 03264250 A | 11/1991 |
| JP | 04025350 A | 1/1992 |
| JP | 8-263546 | 10/1996 |
| JP | 9-050599 | 2/1997 |
| JP | 09212555 A | 8/1997 |
| JP | 10-27200 | 1/1998 |
| JP | 2000-123089 | 4/2000 |
| JP | 2001-34324 | 2/2001 |
| JP | 2001-209676 | 8/2001 |
| WO | WO 98/44439 | 10/1998 |
| WO | WO 01/15001 | 3/2001 |

OTHER PUBLICATIONS

Parker A. Grant and James F. Mazeski; "Turbine Engine Maintenance-Back to Basics Turbine Engine Maintenance Back to Basics", Nov. 2000, retrieved from the web at: http://amtonline.com/publication/article.jsp?publd=1&id=1035.*

Harry Fenton, "Magnetos Under PressureMagnetos Under Pressure", Jul. 2000, retrieved from the web at: http://amtonline.com/publication/article.jsp?publd=1&id=992.*

Jack Hessburg, "Scheduled Maintenance Tasks: Working through the development process with the Maintenance Steering Group", Mar. 2000, retrieved from the web at: http://amtonline.com/publication/article.jsp?publd=1&id=950.*

Bill de Decker, "Save on Maintenance Costs", Mar. 2000, retrieved from the web at: http://amtonline.com/publication/article.jsp-?publd=1&id=952.*

Michael M. DiMauro, "Preventive Maintenance for Thrust Reversers", Mar. 2000, retrieved from the web at: http://amtonline.com/publication/article.jsp?publd=1&id=947.*

Airman 2000: simplifying and optimizing aircraft maintenance, pp. 1-3, retrieved from the web at: http://www.content.airbusworld.com/SITES/Customer_services/html/acrobat/fast_29_p02_07_airman.pdf.*

McQueen, G., "Aircraft Maintenance," *Industrial Maintenance & Plant Operations*, Aug. 1996.

MIL-HDBK-61, Military Handbook, "Configuration Management Guidance," Sep. 1997.

IBM Technical Disclosure Bulletin, Computer-Aided Process Planning, v.37, n.4B, p. 605-608, [online], [retrieved Sep. 11, 2005 via EAST] (3 pages).

Knotts, Robert M.H., Civil Aircraft Maintenance and Support; Fault Diagnosis from a Business Perspective, Journal of Quality in Maintenance Engineering, vol. 5 No. 4, 1999, pp. 335-347. [DIALOG; File 15].

Swanson, Computerized maintenance management systems: a study of system design, Production and Inventory Management Journal, 2nd Qtr 1997, v.38, n.2, p. 11-15 (5 pages).

Dilger, Asset management, maintenance redefined, Manufacturing Systems, Jul. 1997, v.15, n.7, p. 122-128, [on-line], [retrieved Sep. 8, 2005 via Dialog file 624.01167091] (4 pages).

Koch, Manage data to tame the maintenance tiger, Electrical World, Mar./Apr. 2001, v.215, n.2, p. 37. [on-line], [retrieved Sep. 8, 2005 via Dialog file 624:01167091] (4 pages).

Anonymous, maintenance mania, Manufacturing Systems, May 1998, v.16, n.5, p. 80-84, [on-line], [retrieved Sep. 8, 2005 via Dialog file 15:01650138] (4 pages).

Fulcher, ERP and PDM equals productivity, manufacturing systems, Aug. 1998, v.16, n.8, p. 36-40, [online], [retrieved Sep. 8, 2005 via Dialog file 15:01690148] (5pages).

Al-Sultan, Maintenance control via mathematical programming, Journal of Quality in Maintenence Engineering, 1995, v.1, n.3, p. 36-46, [online], [retrieved Sep. 8, 2005 via Dialog file 15:02271208] (9 pages).

Avery, Datastream introduces new online buy system for MRO, Purchasing, Nov. 18, 1999, v.127, n.122 (1 page).

Szwedo, Increasing productivity in an AS/RS maintenance department, Production and Inventory Management Journal, 1st Qtr 1995, v.36, n.1, p. 76-81 (6 pages).

Ho, An on-line system for aircraft maintenance, Journal of Systems Management, Sep. 1994, v.45, n.9, p. 24-27 (4 pages).

Anonymous, Bell & Howell offers maintenance kits, today, Feb. 2000, v.22, n.1, p. 10 (1 page).

Kroenke, David M. Database Processing: Fundamentals, Design and Implementation, 1999 Prentice-Hall; NJ. pp. 3-23.

International Search Report dated Oct. 4, 2002, for corresponding international application PCT/US02/09303.
Written Opinion dated Mar. 5, 2003, for corresponding international application PCT/US02/09303.
International Search Report dated Dec. 28, 2001, for corresponding international application PCT/US01/32154.
International Search Report dated Jan.2, 2002, for corresponding international application PCT/US01/32576.
Morris Cohen et al., "Optimizer: IBM's Multi-Echelon Inventory System for Managing Service Logistics", The Institute of Management Sciences, pp. 65-82. Jan. to Feb. 1990.
Vijayan, Jaikumar, "Fault-Tolerant Computing", Computerworld vol. 34, 1 page, Issue 47, Mar./Apr. 2000.
The prosecution history of U.S. Appl. No. 09/825,633 shown in the attached Patent Application Retrieval file wrapper document list, printed Mar. 7, 2008, including each substantive office action and applicant response.
The prosecution history of U.S. Appl. No. 09/947,024 shown in the attached Patent Application Retrieval file wrapper document list, printed Mar. 7, 2008, including each substantive office action and applicant response.
The prosecution history of U.S. Appl. No. 09/690,793 shown in the attached Patent Application Retrieval file wrapper document list, printed Mar. 7, 2008, including each substantive office action and applicant response.
The prosecution history of U.S. Appl. No. 09/947,136 shown in the attached Patent Application Retrieval file wrapper document list, printed Mar. 7, 2008, including each substantive office action and applicant response.
The prosecution history of U.S. Appl. No. 09/946,894 shown in the attached Patent Application Retrieval file wrapper document list, printed Mar. 7, 2008, including each substantive office action and applicant response.
The prosecution history of U.S. Appl. No. 09/946,093 shown in the attached Patent Application Retrieval file wrapper document list, printed Mar. 7, 2008, including each substantive office action and applicant response.
The prosecution history of U.S. Appl. No. 09/946,095 shown in the attached Patent Application Retrieval file wrapper document list, printed Mar. 7, 2008, including each substantive office action and applicant response.
The prosecution history of U.S. Appl. No. 09/946,032 shown in the attached Patent Application Retrieval file wrapper document list, printed Mar. 7, 2008, including each substantive office action and applicant response.
The prosecution history of U.S. Appl. No. 09/946,160 shown in the attached Patent Application Retrieval file wrapper document list, printed Mar. 7, 2008, including each substantive office action and applicant response.
The prosecution history of U.S. Appl. No. 10/799,914 shown in the attached Patent Application Retrieval file wrapper document list, printed Mar. 7, 2008, including each substantive office action and applicant response.

* cited by examiner

PREDICTIVE MAINTENANCE SYSTEM

FIELD OF THE INVENTION

This invention relates to a method and system for maintaining an item of equipment in accordance with an enhanced predictive maintenance scheme.

BACKGROUND

In the prior art, equipment may be maintained on an ongoing basis where a revision to the equipment results from a defect or deficiency discovered upon an inspection of the equipment. The inspection of the equipment may be performed incidentally to other maintenance activities or the inspection may be part of a scheduled program of maintenance. The scheduled program of maintenance may be organized based upon data or recommendations provided by a manufacturer of the equipment.

Prospective maintenance activities may include maintenance, repair, and overhaul activities. Prospective maintenance activities are planned and identified based on one or more prior inspections of equipment. If the inspections are delayed or too infrequent to uncover an actual or future deficiency, a user of the equipment may experience reduced availability of the equipment. For example, an actual or future deficiency may prevent use of the equipment or may result in a failure of the equipment during routine operation. Further, if the maintenance schedule provided by the manufacturer does not accurately reflect the true performance or reliability of the equipment, a user of the equipment may experience unwanted downtime. If the equipment, when properly functioning, is capable of generating revenue, the downtime of the equipment may negatively impact financial results of a business associated with the equipment. Similarly, if the equipment is essential for manufacturing or other uses, the downtime of the equipment may negatively impact financial results of a business associated with the equipment. Accordingly, a need exist for a method or system for maintaining an item of equipment according to an enhanced predictive maintenance scheme where unwanted downtime of equipment is reduced or eliminated.

SUMMARY OF THE INVENTION

In accordance with the invention, a method and system for maintaining an item of equipment, consistent with an enhanced predictive maintenance scheme supports the provision of predictive maintenance in a manner which eliminates or reduces downtime of the equipment. The method includes tracking performance data on the item of equipment or a particular component of the equipment. At least one required maintenance activity is predicted based upon the observed performance data with respect to a defined performance standard. Performance of the required maintenance activity is scheduled at a defined respective time based upon the prediction.

DETAILED DESCRIPTION

As used herein, a maintenance provider shall include any person or business entity that performs or supports maintenance, repair, or overhaul activity (i.e., an MRO activity) for at least one item of equipment. Similarly, maintenance, a maintenance activity or a maintenance task shall include at least one of maintenance, repair, and overhaul (i.e., MRO) of an item of equipment or a component of the equipment.

A component means a component of an item of equipment, a sub-component of an item of equipment, an assembly of an item of equipment, a system of an item of equipment, or any other constituent part of an item of equipment. A component may be defined based on its relationship with other components in an item of equipment and based upon the context of its use in the equipment. A component may include, but need not include, one or more sub-components. An assembly may comprise a group of integrated or inter-related components. A material refers to a raw material, a consumable material, a component, a provision, or another equipment-related resource concerning the performance of a maintenance activity.

Figure 1:
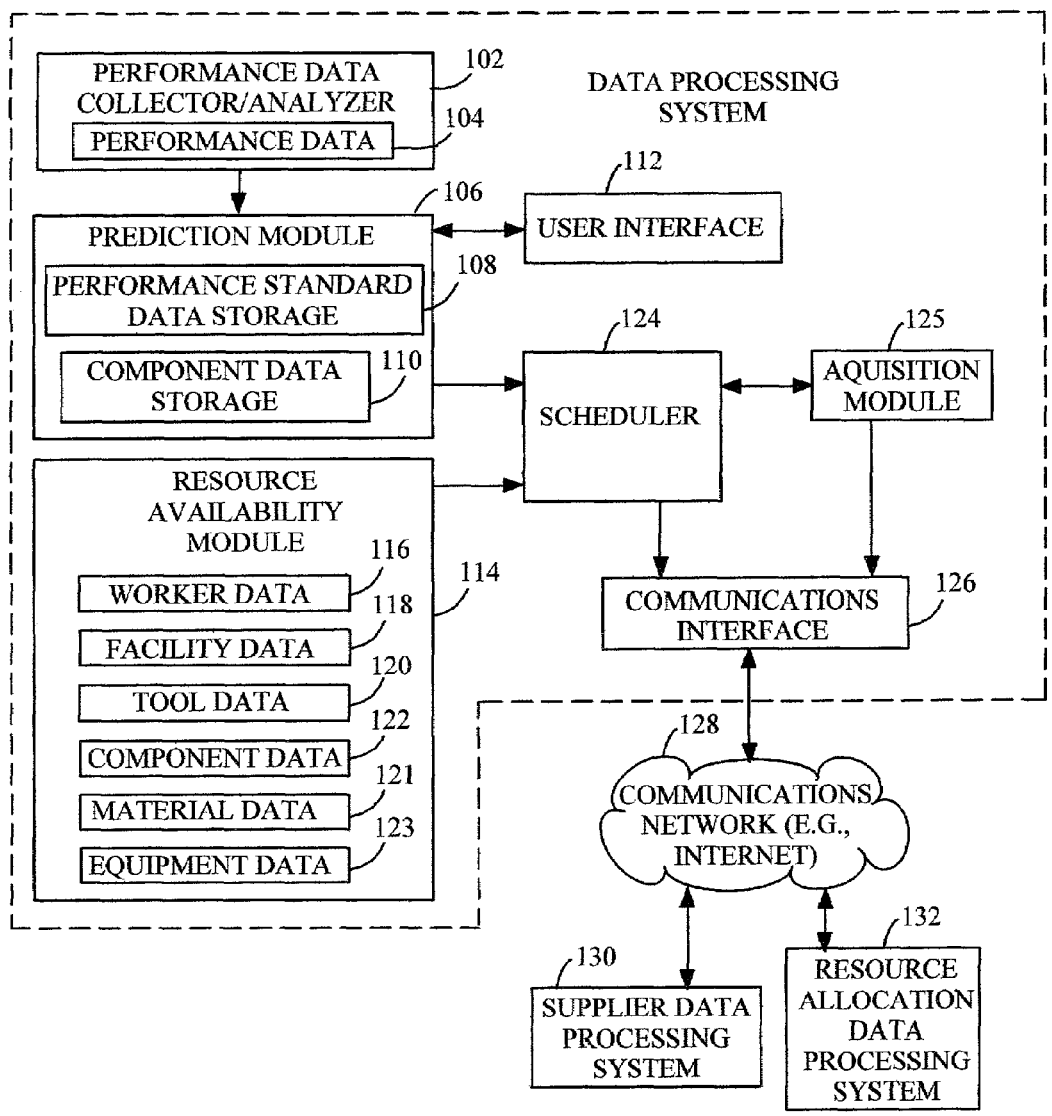
FIG. 1 is a block diagram of a data processing system for performing an enhanced predictive maintenance scheme in accordance with the invention.

In accordance with the invention, FIG. 1 shows a data processing system 100 for performing an enhanced predictive maintenance scheme. The data processing system 100 is coupled to at least one of a resource allocation data processing system 132 and a supplier data processing system 130 via a communications network 128. The communications network 128 may refer to the Internet, an intranet, a data packet network, a public switched telephone network, a circuit-switched telecommunications network, or some other telecommunications network.

The data processing system 100 comprises a performance data collector-analyzer 102 that communicates with a prediction module 106. In turn, the prediction module 106 communicates with a scheduler 124. The prediction module 106 and a resource availability module 114 provide input data to the scheduler 124. The scheduler 124 outputs scheduling data or a maintenance plan (e.g., a resultant maintenance plan) to a communication interface 126 for transmission over the communications network 128. An acquisition module 125 may be coupled to the scheduler 124 and the communications interface 126 to support acquisition of components or materials for maintenance activities. The communications interface 126 supports communications between the scheduler 124 and one or more of the following: a supplier data processing system 130 and a resource allocation data processing system 132.

Figure 2:
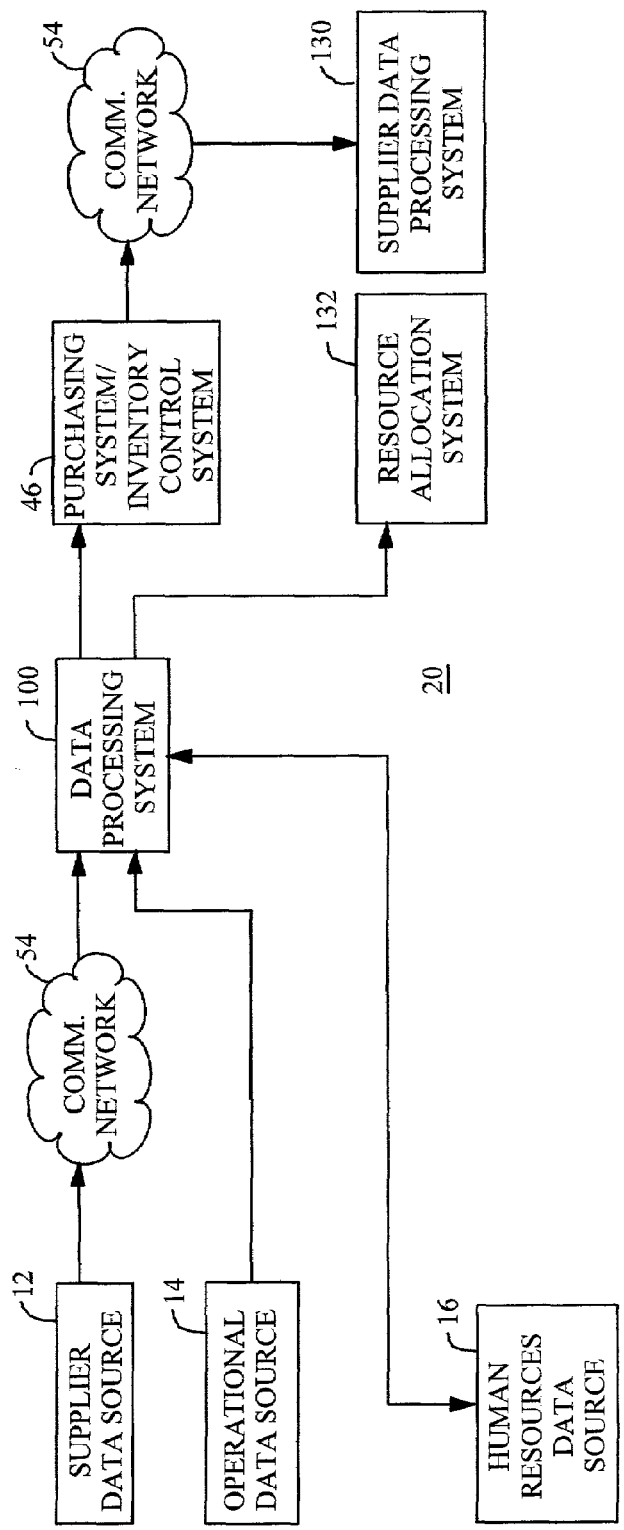
FIG. 2 is a block diagram showing the data processing system of FIG. 1 configured for communication with other network elements in accordance with the invention.

The performance data collector-analyzer 102 may collect performance data 104 from one or more of the following: a supplier data source (12 in FIG. 2), an operational data source (14 in FIG. 2) and a human resources data source (16 in FIG. 2). In one embodiment, the performance data collector-analyzer 102 may collect performance data 104 from an item of equipment where the item of equipment has a sensor or a monitor for feeding performance data 104 to the performance data collector-analyzer 102. The performance data collector-analyzer 102 may analyze, format, or process the performance data 104 into a format which is suitable for interpretation by the prediction module 106.

The prediction module 106 predicts a maintenance activity and an associated time interval for the maintenance activity based upon the performance data 104 with respect to a defined performance standard. The combination of an identified maintenance activity and a corresponding time frame, or date for performance of the maintenance activity, represents a maintenance plan.

A user may enter the performance standard data into the performance standard storage via a user interface 112 associated with the data processing system 100. The user interface 112 may accept entry into via a graphical user interface 112, a keyboard, a pointing device, a magnetic medium, an optical medium, or otherwise. The prediction module 106 manages the storage and retrieval of at least one performance standard in performance standard data storage 108. For example, the prediction module 106 may support querying of the performance standard data storage 108 and the component data storage 110.

The prediction module 106 includes component data storage 110. The component data storage 110 may comprise a component identifier and other affiliated information, such as whether particular component identifier complies with the performance standard. Further, the component data storage 110 may contain any of the following information: a preferable future date for performing predictive maintenance; a time-frame for performing predictive maintenance; a preliminary schedule for scheduling predictive maintenance; an assembly identifier for the identifying an assembly associated with a component, and item identifier for identifying an item of equipment associated with the component, and any other applicable data on a component or an end item of equipment. Information on tentative time frames for performing predictive maintenance may be refined by the scheduler 124. Information on relationships between revisable components and related sub-components, a related assembly, or a related system may be used to define the requisite scope of the revision of the maintenance plan.

The prediction module 106 may store reference performance data on a component of an assembly, a system, an assembly, or the equipment consistent with at least one performance standard. The prediction module 106 accepts the collected or observed performance data 104 on the component, an assembly, or equipment and performs a comparison against a reference performance data standard based upon a component, an assembly, or the equipment. If the collected or observed performance data 104 deviates by a material amount or significant amount from a reference performance data 104 of the performance standard, then any affected component, assembly, system or sub-component is identified as suspect. A suspect item requires attention or predictive maintenance to be scheduled. For example, if the collected performance data 104 is noncompliant with the reference performance data 104 of the performance standard, based upon the equipment as a whole, the affected components or assembly of the equipment may be flagged as suspect components. In one embodiment, a user may clear a suspect status by entering an acknowledgement via the user interface 112.

The reference performance data 104 refers to the equipment as a whole and the performance standard may relate to the equipment as a whole. The identification of components to be replaced or maintained in that equipment may be based upon historical relationships between the particular deficiencies in the collected performance data 104 and likely or probable suspected components.

The prediction module 106 determines a preliminary maintenance schedule for performing predictive maintenance. The preliminary maintenance schedule comprises a preliminary proposed date or a preliminary proposed time interval for performing a maintenance activity (e.g., maintenance, repair or overhaul, which may be referred to as MRO) on a suspect sub-component, suspect component, suspect assembly, suspect system, or suspect item of equipment.

A resource availability module 114 contains temporal data on when corresponding resources are available for performing a prospective predictive maintenance activity. In one embodiment, the resource availability module 114 contains temporal data and related geographic data on performing prospective predictive maintenance activity.

A resource availability module 114 manages one or more of the following types of data: worker data 116, facility data 118, tool data 120 and component data 122. The resource availability module 114 provides prospective availability dates, prospective time intervals, or both for one or more of the following: a worker, a facility, a tool, a maintenance task (e.g., an MRO task), a component, a material, and an item of equipment. In one embodiment, the resource availability module 114 tracks worker data 116 that includes worker identifiers, corresponding qualifications of the workers, and respective geographic locations of the workers. Facility data 118 provides availability space for repairing, maintaining, or overhauling equipment. Further, facility data 118 refers to infrastructure at respective facilities for performing certain types of maintenance, repair and overhaul activities on the equipment. Tool data 120 refers to availability dates and time intervals of certain tools to complete corresponding maintenance, repair or overhaul of the equipment. A tool may refer to any device that assists a worker in performing or conducting a maintenance activity on equipment. For example, a tool may comprise a hand tool, a power tool, test equipment, diagnostic equipment, a test fixture, or the like.

Component data 122 refers to availability dates and time intervals of a component, a sub-component, an assembly, or a system for installation or maintenance activities. The component data 122 may define availability dates or time intervals of the equipment based upon one or more of the following types of information: a supplier lead times, an anticipated shipment date, an anticipated delivery date or receipt of equipment, an outstanding order, an inventory of a component, sub-component, assembly or system, an expected receipt of a component, sub-component, assembly, system, or like information.

The material data 121 refers to data on the availability of a raw material, a consumable, a component, a provision, or another equipment-related resource concerning the performance of a maintenance activity. For example, the material data comprises: (1) a material identifier that uniquely identifies a particular material associated with a maintenance activity, (2) a geographic location indicator that indicates the location of the material identifier, and (3) a date or time interval to which the geographic location indicator corresponds.

The equipment data 123 defines the availability of a particular item of equipment. For example, the equipment data comprises: (1) an equipment identifier that uniquely identifies a particular item of equipment, (2) a geographic location indicator that indicates the location of the equipment, and (3) a date or time interval to which the geographic location indicator corresponds.

The scheduler 124 accepts input from both the prediction module 106 and the resource availability module 114. The scheduler 124 may accept the input of suspect component data and a preliminary maintenance schedule derived from the prediction module's comparison of collected performance data 104 to reference performance data 104. The scheduler 124 accepts the input of the preliminary proposed date or preliminary proposed time interval for predictive maintenance and determines a resultant date or a resultant time interval for performing predictive maintenance based upon a consideration of the resource availability data as related to the suspect data. The scheduler 124 preferably reconciles the preliminary maintenance schedule with temporal resource availability of one or more of the following: workers, facility, tools, components, materials (e.g., a consumable material or a raw material), and equipment.

The scheduler 124 may revise the preliminary maintenance schedule (e.g., the preliminary proposed maintenance date or time interval) to a resultant maintenance schedule (e.g., a resultant maintenance date or time interval) if at least one of the resources is not available consistent with the preliminary maintenance schedule. However, the scheduler 124 may consider substitution of alternate components prior to revision of the preliminary maintenance schedule. Accordingly, the resultant maintenance schedule may be the same as the preliminary maintenance schedule, if all of the resources are available per the preliminary maintenance plan or if an alternate component can be substituted to preserve a preliminary maintenance schedule. The resultant maintenance schedule assures availability of all necessary resources to perform a maintenance activity on the resultant date or at the resultant time interval.

The scheduler 124 may use the preliminary schedule and the resource availability data provided as worker data 116, facility data 118, tool data 120 and component data 122 to generate a resultant schedule or planned maintenance plan for performing predictive maintenance on the equipment. The communication interface provides an interface for allowing the scheduler 124 to communicate the resultant maintenance plan over a communication network to a supplier data processing system 130, a resource allocation data processing system 132, or the like.

The supplier data processing system 130 may comprise an enterprise resource planning system or supplier fulfillment center, for example. The supplier data processing system 130 may support the maintenance entity's ordering of components, materials (e.g., consumable materials), tools (e.g., test equipment or diagnostic equipment) and other resources necessary to complete predictive maintenance of the equipment.

The resource allocation data processing system 132 may facilitate communications with workers for performing predictive maintenance. The resource allocation data processing system 132 may also facilitate the distribution of components supplied by the supplier internally within a maintenance provider (e.g., an MRO organization). For example, the resource allocation data processing system 132 may support the logistics involved with distributing inventory of the maintenance organization internally to multiple (maintenance, repair or overhaul) facilities located in geographically disparate or widely separated regions. Accordingly, resource allocation data processing system 132 may consider a transportation cost, freight cost, custom duties, scheduling of shipments, packaging of shipments, and other activities which are necessary to insure that timely and accurate provision of material, tools and the availability of workers. The resource allocation data processing system 132 assures that repairs may be carried out and maintenance may be carried out without disruption from the unavailability of a qualified worker, a suitable facility, a requisite tool, a requisite component, a requisite consumable or any other information within the time frame of scheduled by the scheduler 124 for performance of the predictive maintenance.

Figure 3:
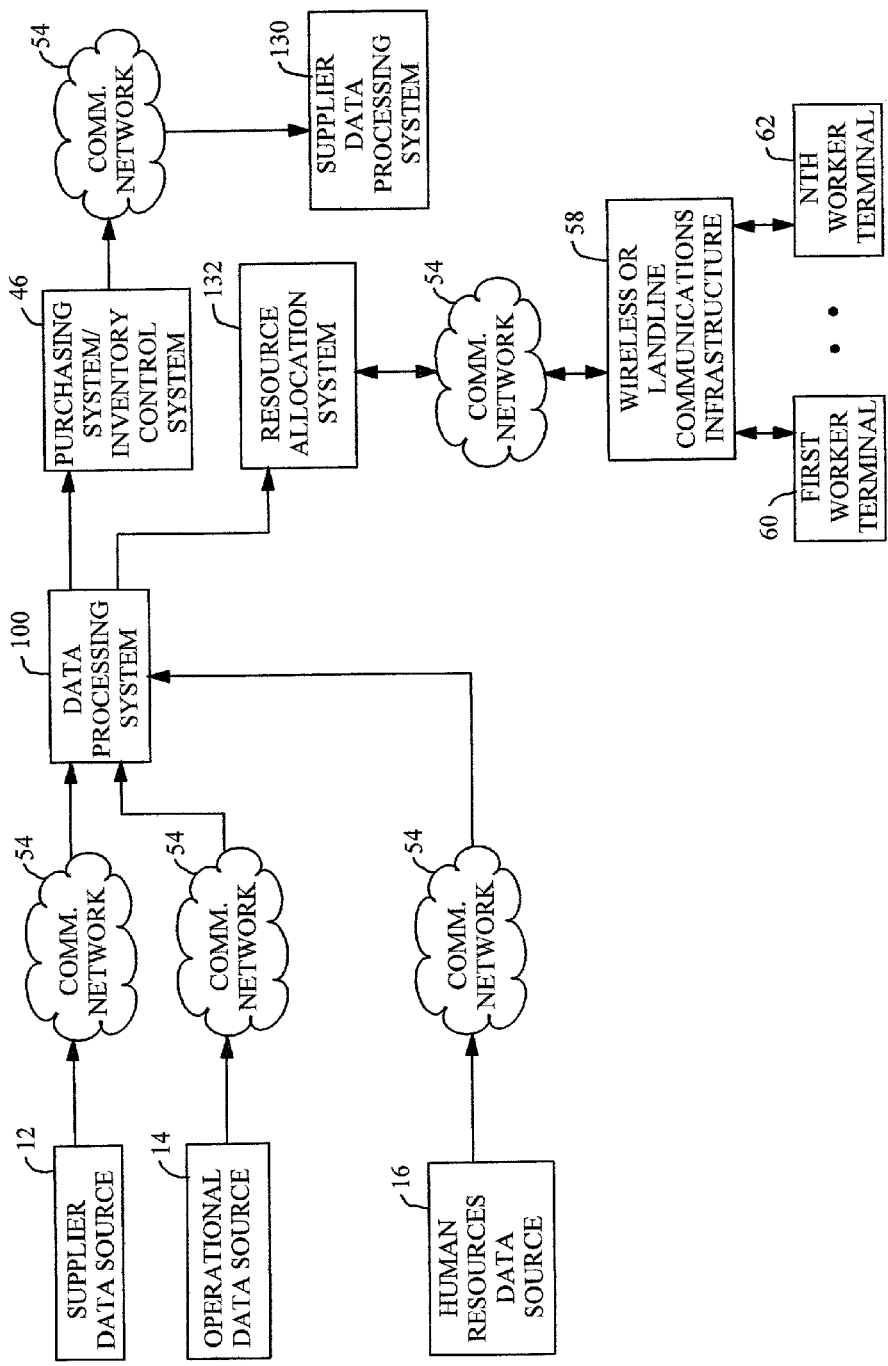
FIG. 3 shows an alternate embodiment of FIG. 2 in which a resource allocation system is coupled to a wireless or landline communication infrastructure via communication network.

FIG. 2 and FIG. 3 show illustrative examples of how a data processing system 100 may be used in conjunction with a communication network 54 to integrate various aspects of predictive maintenance in accordance with the invention.

In FIG. 2, a data processing system 100, the operational data source 14, the human resources data source 16, the resource allocation system 132, and the purchasing system 46, may be co-located at a common site or in close proximity to one another.

In contrast, the supplier data source 12 may communicate with the data processing system 100 over a communication network 54. The supplier data source 12 may be located at a supplier site. A supplier site refers to any site that is owned or controlled by the supplier of a component, an assembly, a system or the equipment. Similarly, a supplier data processing system 130 (e.g., an order fulfillment center) may be located at the supplier site. The purchasing system 46 communicates with the supplier data processing system 130 over communication network 54. The communication network 54 may comprise the Internet and intranet, a communication system that supports a switched circuit connection, a communication system that supports a virtual connection, a data packet network, or another suitable telecommunication interconnection.

The supplier data source 12, the operational data source 14 and the human resources data source 16 communicate with the data processing system 100 over one or more communication network 54. The data processing system 100, the purchasing system 46 and the personnel management system may be co-located. The purchasing system 46 preferably communicates with the supplier's data processing system 130.

The data processing system 100 supports electronic communication with the supplier data source 12. The electronic communication may facilitate reduced costs in maintaining one or more items of equipment through the availability of useful information on at least one of maintenance, repair, or overhaul (e.g., MRO) of equipment. For example, useful information may include performance data 104 or manufacturing data. Performance data 104 or manufacturing data may be made available to the data processing system 100 to foster determination of an accurate preliminary schedule or resultant schedule for predictive maintenance on the equipment.

The purchasing system supports communication with the supplier data processing system 130, such as a supplier order fulfillment center. Communication between the purchasing system 46 and the supplier data processing system 130 may be automated to facilitate the acquisition of component, an assembly of components, of system of components, or other materials to meet planned maintenance activity or maintenance requirements.

The operator or user of the equipment may reduce the downtime for the equipment by predicting potential failures of the equipment or breakdowns of the equipment in advance of such breakdowns or failures actually occurring. Maintenance activities are preferably performed in a proactive manner, as opposed to, a reactive manner after a defect or deficiency in the equipment has been identified through an inspection. The communication network 54 of FIG. 2 supports a distributed entity or maintenance provider that manages predictive maintenance of the equipment. A distributed entity or maintenance provider may have human resources (e.g., maintenance workers) and components of equipment that may be located at different geographic locations. Further, the equipment may be mobile or portable with geographic locations that change over time during normal use of the equipment (e.g., where the equipment represents a passenger airplane).

Referring to FIG. 3, the resource allocation system 132 may communicate with a wireless or landline communications infrastructure 58 via a communication network 54. The wireless or landline communication infrastructure 58 may be associated with the first worker terminal 60 through an nth worker terminal 62. The worker terminals (60, 62) represent electronic terminals of the workers who are responsible for maintaining the equipment. For example, each worker terminal (60 or 62) may represent a mobile phone, a mobile terminal with a display, a pager, a personnel digital assistant, or another communications device.

In one embodiment, the worker terminals (60, 62) and the wireless communications infrastructure (58) support a two-way messaging interface. Accordingly, the workers can interact with the resource allocation system to provide real time availability information and to check on future assignments of planned maintenance.

Figure 4:
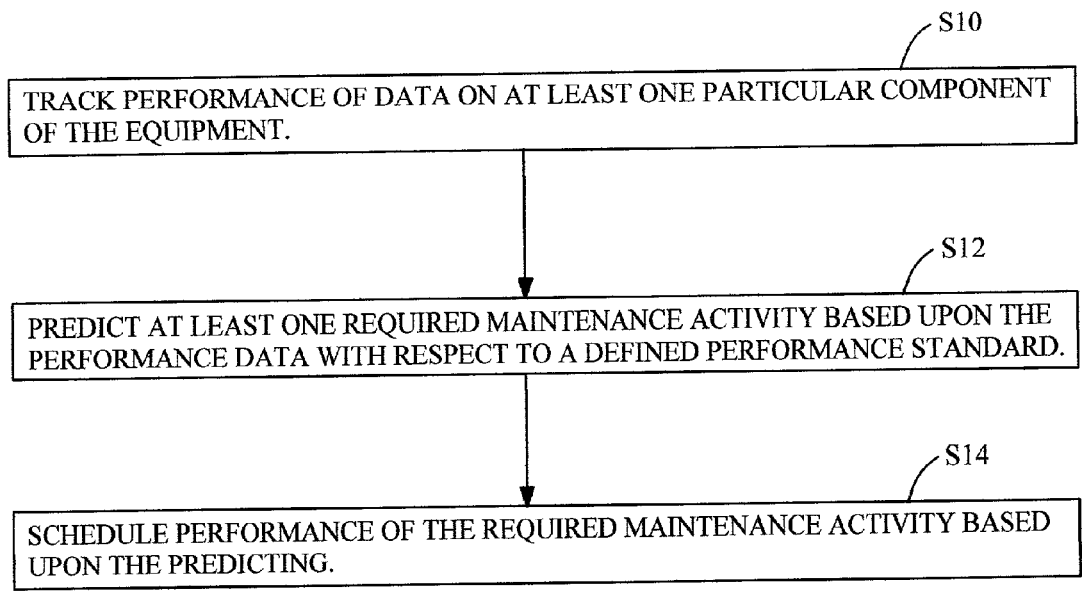
FIG. 4 is a flowchart of a method for maintaining an item of equipment in accordance with an enhanced predictive maintenance scheme.

FIG. 4 shows a flowchart of a method for maintaining item of equipment in accordance with the invention. The method of FIG. 4 begins in step S10.

In step S10, performance data 104 is tracked on at least one particular component of the equipment. For example, the data processing system 100 may collect or gather performance data 104 on a component of the equipment, an assembly of components, or the equipment as a whole. The data processing system 100 may gather or collect performance data 104 from an operational data source 14 or a human resources data source 16. The operational data source 14 may represent a monitor or a sensor associated with the equipment for measuring a particular component, an assembly, or the performance of the equipment as a whole. In the method of FIG. 4, the particular component may be defined based on its relationship to other components the mounting position or geographic position of the particular component on the equipment and the context of the use of the particular component.

The human resources data source 16 may be associated with workers that enter data into a database or a user interface 112 on the performance of a component, an assembly, or on the equipment as a whole. The actual data on the equipment that is entered via a user interface (e.g., 112) or otherwise and provided by the human resources data source 16 may be gathered by inspection of one or more of the following: sensors, monitors or other inspection of the equipment. The observed or collected performance data 104 or operational data may be provided by the operational data source 14, the human resources data source 16, or both.

In step S12, the data processing system 100 predicts at least one required maintenance activity based upon the collected or observed performance data 104 with respect to a defined performance standard. For example, the prediction module 106 of the data processing system 100 predicts at least one required maintenance activity if the performance data 104 indicates that a defined performance standard has not been met. The defined performance standard may be defined such that noncompliance indicates that predictive maintenance is required or that predictive maintenance is necessary at some future date or over some future time interval to achieve a certain reliability or availability of the equipment for productive use. In one embodiment, the performance standard is defined as a measurable achievement of a required specific task within limits established by design calculations or in-service observations. A defined performance standard may be based on one or more of the following: a compliance factor, a safety factor, a quality factor, an economic factor, and any other suitable factor.

The prediction module 106 may store performance standard data and component data. The component data may include a component identifier and an associated maintenance indicator. The maintenance indicator may indicate whether predictive maintenance is required or not such that a preliminary maintenance activity is conveyed to the scheduler 124. Further, the component data may be associated with a timeframe or maintenance date of a preliminary maintenance plan or a resultant maintenance plan.

In step S12 the maintenance activity may be defined in accordance with predetermined levels of maintenance. In particular, the maintenance activity may be defined with reference to differential levels of maintenance within a hierarchical scheme of maintenance levels. The differential levels of the hierarchical scheme may represent different priority levels for performing the maintenance and organizing the resultant maintenance plan as a temporal sequence of ordered maintenance activities. For example, a highest priority level of maintenance may be performed first prior to a lower level of priority of a maintenance activity. Each maintenance activity may be classified in accordance with different types of maintenance, which correspond to the maintenance levels.

In step S14, the data processing system 100 schedules performance of the required maintenance activity based upon the predicting (e.g., of a resultant maintenance plan). The scheduler 124 of the data processing system 100 may schedule performance of the required maintenance by considering the component data identifier, the maintenance identifier and any associated maintenance date as an input to the scheduler 124.

Another set of inputs to the scheduler 124 is provided by the resource availability module 114 which may provide one or more of the following: worker data 116, facility data 118, tool data 120, and component data 122. The resource availability module 114 provides the availability of a component, a facility, a tool, a worker, an assembly and the equipment to perform maintenance at a perspective date and at a perspective location.

Following step S14, the scheduler 124 may facilitate communication of the final or resultant maintenance plan (established by the scheduler 124) via the communication interface 126. The communication interface 126 may communicate the resultant maintenance plan to a resource allocation data processing system 132 via the communication network 128. In one example, the resource allocation data processing system 132 may contact a worker, a manager of a facility or another manager of a resource to coordinate the availability of resources necessary to meet or comply with the resultant maintenance plan.

The scheduler 124 may communicate with an acquisition module 125, which is coupled to the communication interface 126. The acquisition module 125 may comprise a purchasing module that parses, sorts, or organizes the data in the resultant maintenance plan that is necessary to generate a purchase order, forecast, demand data, or other acquisition data. The communications interface 126 transmits the acquisition data to the supplier data processing system 130 via the communication network 128 or otherwise to a supplier data processing system 130 via the communication network 128. Accordingly, the supplier data processing system 130 may facilitate fulfillment of orders or other acquisition data sent by the acquisition module 125.

An additional step may follow step S14. The additional step may include inspecting at least one component of the equipment at an interval. Further, if a deficiency is discovered during the inspection, supplemental maintenance is scheduled for the discovered deficiency of the at least one component or for the item of equipment.

Figure 5:
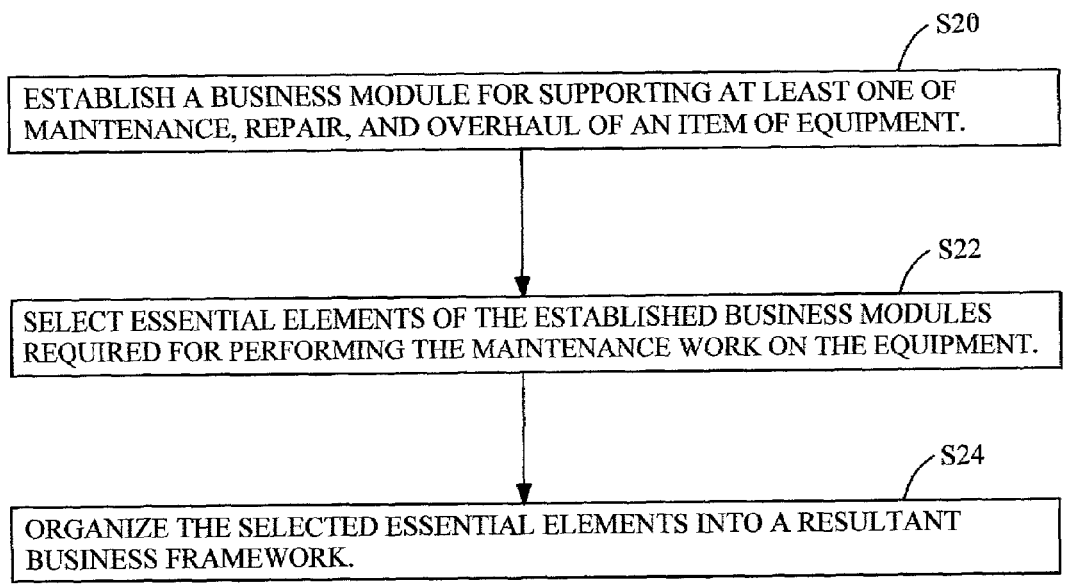
FIG. 5 is a flowchart of a method for supporting an enhanced predictive maintenance scheme.

FIG. 5 is a flowchart of a method for supporting an enhanced predictive maintenance scheme in accordance with the invention. The method of FIG. 5 starts in step S20.

In step S20, a business module is established for supporting at least one of maintenance, repair and overhaul of an item of equipment. For example, consistent with FIG. 1 a data processing system 100 may include one or more of the following business modules: a prediction module 106 for supporting predictive maintenance and a resource availability module 114 for supporting predictive maintenance. The business module generally refers to a software program, software routine, a sub-routine, or program instructions that are design to perform one or more tasks associated with at least one of maintenance, repair, and overhaul of an item of equipment. Further, the business module may include hardware, computer architecture, communications equipment, logical devices, or other mechanisms to perform one or more tasks associated with a business of a maintenance provider.

In step S20, the established business modules may include one or more of the following: a multi-dimensional configuration manager, a configuration manager, a predictive analyzer, a maintenance-repair-and-overhaul business module, and activity-cost manager, and a nomenclature manager. Essential elements refer to modular constituent parts of one or more established business modules.

In one embodiment, the established business module may comprise a nomenclature manager. The nomenclature manager is established to support a universal nomenclature definition applicable to at least one of a component, an equipment, a system, a group of components, and an assembly of components to support the exchange of data associated with the nomenclature definition. For example, data may be exchanged between different business entities or partners.

In another embodiment, an established business module comprises a search engine for querying a database containing components associated with corresponding universal nomenclature descriptors.

In yet another embodiment, the established business module comprises an activity-cost manager for tracking the cost of maintaining at least one of a component, an assembly of components and an item of equipment.

In still another embodiment, if the established business module comprises a multi-dimensional configuration manager, the multi-dimensional configuration manager defines a component content for the item of equipment, an integration of the component content supported by at least one of a functional descriptor, a logical descriptor, and physical descriptor.

In another embodiment, if the established business module comprises a predictive analyzer, the predictive analyzer generates a prediction of maintenance activity with reference to one or more of the following: an actual discovery of a maintenance need from inspection of the equipment, and estimation of the maintenance need from a current performance evaluation of the equipment, and a forecast of the maintenance need from historical performance evaluation of the equipment.

In step S22, the essential elements of one or more established business module are selected. The established business modules are required for performing the maintenance work. For example, the prediction module 106 may include a data manager (not shown) as an essential element of the prediction module 106 as the established business module. The data manager may manage the storage of performance standard data. Similarly, the resource availability module 114 may comprise an availability data manager (not shown) as an essential element of the resource availability module 114. The availability data manager may manage storage and retrieval of availability data. Availability data may include one or more of the following: worker data 116, facility data 118, tool data 120 and component data 122. The availability data may be regarded as an essential element of the resource availability module 114.

The essential elements or core elements of an established business module may coincide with the desired features of the business module as a whole. Essential elements may refer to modular constituent parts of the corresponding established business module. Each feature may require one or more essential elements to properly function. Other elements of the established business module may be optional or may supplement essential elements of the business that are required for operation of the business module. These optional elements of the business module may support optimization of a business process or tailoring of a business to meet a particular objective of the end-user in a maintenance, repair and overhaul environment.

In step S24, the selective elements are organized into a resultant business framework. The resultant business framework is geared to achieve an objective of an end user with respect to at least one of the maintenance, repair and overhaul of the item of equipment. In the example where the established business modules include the prediction module 106 and the resource availability module 114 and where the essential elements include the data manager and the availability data manager, the resultant business framework may include an integration module or an integration component for integration of the selected essential elements.

In the foregoing example, integration of the essential elements of the established business modules may be provided by the scheduler 124 as the integration module. The scheduler 124 accepts input data from both the prediction module 106 and the resource availability module 114 to yield a final or resultant maintenance plan. The resultant maintenance plan is based on an evaluation of data provided by both the prediction module 106 and the resource available module.

Additional functionality could be potentially be added to the resultant business framework by selecting at least one additional essential element or an additional established business module, besides the prediction module 106 and the resource availability module 114. Where an additional element is selected or established, the integration module, apart from the scheduler 124, may support coordination and harmonization of the additional element(s) of the established business module. Therefore, an additional integration module (not shown) or integration component (not shown) may be necessary to achieve the desired functionality where additional optional elements are added to the data processing system 100.

In step S24, the organizing of the essential elements may comprise integrating and linking the selecting essential elements across different business modules to support efficient allocation of at least one of human resources (e.g., manpower), test equipment, maintenance tools, components, infrastructure and a facility for performing predictive maintenance. If the established business module comprises a configuration manager, the configuration manager may define a component content for the item of equipment, an integration of the component content, and an inter-relationship of the component content.

The foregoing detailed description of the invention describes several illustrative embodiments of the invention. Variations, alterations, or other modifications of the illustrative embodiments may be possible and may fall within the scope of the invention. Accordingly, the scope of the following claims should not be unduly limited by the illustrative examples in the detailed description of the invention.

The invention claimed is:

1. A predictive maintenance method for an item of equipment, the method comprising:
   establishing a first business module as a first resultant business framework for supporting maintenance work on the item of equipment, the resultant business framework comprising at least three feature modules including:
      a prediction module determining predictive maintenance as part of the maintenance work based on an actual discovery of a maintenance need from inspection of the equipment, estimation of the maintenance need from a current performance evaluation of the equipment, and a forecast of the maintenance need from historical performance evaluation of the equipment,
      a resource availability module comprising temporal data and related geographic data of resources for performing prospective predictive maintenance activity; and
      an integration module comprising a scheduler integrating the prediction module and the resource availability module;
   selecting first core elements for the first business module required for performing the maintenance work on the item of equipment wherein the core elements comprise modular constituent parts of the first business module, and wherein desired features of the first business module determine the first core elements and define functions of the first core elements, the first core elements including;
      a performance data manager in the prediction module managing storage and retrieval of performance standard data indicative of a measurable achievement of a required specific task of the maintenance work within a specified time limit; and
      an availability data manager in the resource availability module managing storage and retrieval of availability data, the availability data including worker data, facility data, tool data and component data for performing the maintenance work;
   organizing the first core elements into the first resultant business framework of a first provider of the maintenance work;
   establishing an additional business module comprising additional core elements as an additional resultant business framework of an additional provider of the maintenance work;
   integrating and linking the first core elements and the additional core elements across the first business module and the additional business module for allocation of human resources, test equipment, maintenance tools, components, infrastructure and a facility for performing the predictive maintenance included in the maintenance work; and
   executing the established first business module by predicting with the prediction module, and as part of the maintenance work, a first required maintenance activity on a first component and a second required maintenance activity on a second component by:
      prior to performing either of the first and second required maintenance activities, identifying the first component and the second component as suspect components of the item of equipment when first component performance data, received from an equipment sensor, and second component performance data, input at a prediction module user interface, deviate from a defined performance standard;
      flagging the first component and the second component of the item of the equipment with a suspect status;
      clearing the suspect status of the first component in response to an acknowledgement input at the prediction module user interface prior to initiating performance of the first required maintenance activity;
      determining a preliminary maintenance schedule for performing the second required maintenance activity on the second equipment; and
   wherein executing the established business module further comprises scheduling performance of the second required maintenance activity for the item of the equipment with the scheduler by:
      determining a first revision to the preliminary maintenance schedule, the first revision specifying substitution of an alternate component for the second component of the item of equipment; and
      generating a resultant maintenance schedule based on the preliminary maintenance schedule and the first revision.

2. The method according to claim 1 further comprising defining the first and second required maintenance activities in accordance with differential levels of maintenance within a hierarchical scheme of maintenance levels, wherein the differential levels of the hierarchical scheme comprise different priority levels for performing the first and second required maintenance activities and organizing the resultant maintenance plan as a temporal sequence of ordered maintenance activities.

3. The method according to claim 1 further comprising:
   parsing data in the resultant maintenance schedule to obtain a determination of whether or not to generate a purchase order; and
   when the purchase order should be generated, generating the purchase order to obtain requisite components for facilitating execution of the resultant maintenance schedule.

4. The method according to claim 1 further comprising inspecting the equipment at an interval and scheduling supplemental maintenance associated with a discovered deficiency during inspection.

5. The method according to claim 1 further comprising defining the first component based on its relationship to the second component and the context of its use.

6. The method according to claim 1 wherein establishing the first business module further comprises:
   establishing a multidimensional configuration manager, the multidimensional configuration manager defining a component content for the item of equipment, an integration of the component content supported by a functional descriptor, a logical descriptor, a physical descriptor, or a combination thereof.

7. The method according to claim 1 wherein executing the established first business module further comprises forecasting, with the prediction module, an additional maintenance activity based on historical performance evaluation of the item of equipment.

8. The method according to claim 1 wherein establishing the first business module further comprises:
   establishing a nomenclature manager establishing a universal nomenclature definition applicable to at least one of the components, an equipment, a system, an assembly of components, or a combination thereof to support the exchange of data associated with the nomenclature definition.

9. The method according to claim 1 wherein establishing the first business module further comprises:
establishing a search engine for querying a database containing components associated with corresponding universal nomenclature descriptors.

10. The method according to claim 1 wherein establishing the first business module further comprises:
establishing an activity-cost manager tracking the costs for maintaining the components, an assembly of components, the item of equipment, or a combination thereof.

11. A computer architecture for implementing a predictive maintenance system for an item of equipment, comprising:
a first business module as a first resultant business framework for supporting maintenance work on the item of equipment, the resultant business framework comprising at least three feature modules including:
a prediction module operable to determine predictive maintenance as part of the maintenance work based on an actual discovery of a maintenance need from inspection of the equipment, estimation of the maintenance need from a current performance evaluation of the equipment, and a forecast of the maintenance need from historical performance evaluation of the equipment;
a resource availability module comprising temporal data and related geographic data of resources for performing prospective predictive maintenance activity; and
an integration module comprising a scheduler that integrates the prediction module and the resource availability module;
first core elements for the first business module required for performing the maintenance work on the item of equipment wherein the core elements comprise modular constituent parts of the first business module, and wherein desired features of the first business module determine the first core elements and define functions of the first core elements, the first core elements organized into the first resultant business framework of a first provider of the maintenance work, the first core elements including:
a performance data manager in the prediction module and operable to manage storage and retrieval of performance standard data indicative of a measurable achievement of a required specific task of the maintenance work within a specified time limit; and
an availability data manager in the resource availability module and operable to manage storage and retrieval of availability data, the availability data including worker data, facility data, tool data and component data for performing the maintenance work;
an additional business module comprising additional core elements as an additional resultant business framework of an additional provider of the maintenance work;
a data processing system operable to:
integrate and link the first core elements and the additional core elements across the first business module and the additional business module for allocation of human resources, test equipment, maintenance tools, components, infrastructure and a facility for performing the predictive maintenance included in the maintenance work; and
execute the first business module by executing the prediction module to predict a first required maintenance activity on a first component and a second required maintenance activity on a second component,
wherein the prediction module is further operable to:
identify, prior to performing either of the first and second required maintenance activities, the first component and the second component as suspect components of the item of equipment when the first component performance data, received from an equipment sensor, and the second component performance data, input at a prediction module user interface, deviate from a defined performance standard;
flag the first and second components with a suspect status,
clear the suspect status of the first component in response to an acknowledgement input at the prediction module user interface prior to initiating performance of the first required maintenance activity for the first component, and
determine a preliminary maintenance schedule for performing the second required maintenance activity on the second component; and
wherein the data processing system is further operable to execute the first business module by executing the scheduler, the scheduler operable to:
accept input from the prediction module and schedule the second required maintenance activity for the second component of the item of equipment in a resultant maintenance schedule;
determine a first revision to the preliminary maintenance schedule, the first revision specifying substitution of an alternate component for the second component of the item of equipment; and,
generate the resultant maintenance schedule based on the preliminary maintenance schedule and the first revision.

12. The computer architecture according to claim 11, wherein the first and second required maintenance activities correspond to differential levels of maintenance within a hierarchical scheme of maintenance levels, and wherein the differential levels of the hierarchical scheme represent different priority levels for performing the first and second required maintenance activities and organizing the resultant maintenance plan as a temporal sequence of ordered maintenance activities.

13. The computer architecture according to claim 11, wherein the first business module further comprises an acquisition module configured to parse data contained in the resultant maintenance schedule to obtain a determination of whether or not to generate a purchase order, wherein the acquisition module is further configured to generate the purchase order to obtain requisite components for facilitating execution of the resultant maintenance schedule.

14. The method according to claim 1, wherein the resource availability module determines a temporal and geographic correspondence of the resources required for the performance of the second required maintenance activity; and
wherein generating the resultant maintenance schedule further comprises:
generating the resultant maintenance schedule based on the preliminary maintenance schedule, the first revision and the temporal and geographical correspondence.

15. The computer architecture according to claim 11, wherein the resource availability module comprises material data that specifies a temporal and geographic correspondence of the resources required for the performance of the second required maintenance activity; and
wherein the scheduler is further operable to generate the resultant maintenance schedule based on the preliminary maintenance schedule, the first revision, and the temporal and geographic correspondence.

* * * * *

UNITED STATES PATENT AND TRADEMARK OFFICE
CERTIFICATE OF CORRECTION

| | | |
|---|---|---|
| PATENT NO. | : 7,457,763 B1 | Page 1 of 1 |
| APPLICATION NO. | : 09/947157 | |
| DATED | : November 25, 2008 | |
| INVENTOR(S) | : Gary R. Garrow et al. | |

It is certified that error appears in the above-identified patent and that said Letters Patent is hereby corrected as shown below:

On the Title Page

Page 2, left column, line 54, under "U.S. PATENT DOCUMENTS", replace "2002/0143561" with --2002/0143564--.

Page 2, left column, line 56, under "U.S. PATENT DOCUMENTS", after "1/2003" replace "McIntrye" with --McIntyre--.

Page 2, left column, line 58, under "U.S. PATENT DOCUMENTS", after "3/2003" replace "Suernondft" with --Suermondt--.

Page 2, right column, line 47, under "OTHER PUBLICATIONS", replace "(5pages)." with --(5 pages).--.

Signed and Sealed this

Thirty-first Day of July, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,457,763 B1 | Page 1 of 1 |
| APPLICATION NO. | : 09/947157 | |
| DATED | : November 25, 2008 | |
| INVENTOR(S) | : Garrow | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1667 days.

Signed and Sealed this
Thirtieth Day of October, 2012

David J. Kappos
*Director of the United States Patent and Trademark Office*